(12) United States Patent
Williams et al.

(10) Patent No.: US 6,610,358 B1
(45) Date of Patent: *Aug. 26, 2003

(54) SYSTEM AND METHOD FOR TWO SIDED SHEET TREATING

(75) Inventors: Joel Lane Williams, Troy, TX (US); Earl Soudelier, Gatesville, TX (US); Donald M. Marshall, Temple, TX (US); Robson Mafoti, Temple, TX (US)

(73) Assignee: Premark RWP Holdings, Inc., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/267,493

(22) Filed: Mar. 12, 1999

(51) Int. Cl.[7] .................................. B05D 1/28
(52) U.S. Cl. ................. 427/211; 427/172; 427/207.1; 427/348; 427/358; 427/359; 427/361; 427/391; 427/209; 156/278; 156/307.4
(58) Field of Search .................. 427/211, 172, 427/348, 356, 358, 359, 361, 391, 207.1, 208.4, 208.8, 428, 209; 118/68, 63, 223; 156/278, 307.4

(56) References Cited

U.S. PATENT DOCUMENTS

| | | | |
|---|---|---|---|
| 1,835,741 A | 12/1931 | Allen | |
| 2,118,549 A | 5/1938 | Cochrane, Jr. | 154/2 |
| 2,252,345 A | 8/1941 | Johnson | 91/33 |
| 2,309,090 A | 1/1943 | Bauer et al. | 117/155 |
| 2,325,798 A | * 8/1943 | Porter | 117/68 |
| 2,347,643 A | 5/1944 | Schieman | 117/68.5 |
| 2,364,505 A | 12/1944 | Bennett | 117/62 |
| 2,766,807 A | 10/1956 | Marian | 154/37 |
| 3,196,038 A | 7/1965 | Schoch et al. | 117/68 |
| 3,231,418 A | * 1/1966 | Muggleton | 117/111 |
| 3,320,086 A | 5/1967 | Ross et al. | 117/68 |
| 3,620,899 A | 11/1971 | Kelly et al. | |
| 3,716,395 A | 2/1973 | Bauer et al. | 117/68 |
| 3,899,615 A | 8/1975 | Wallstén | 427/211 |

(List continued on next page.)

FOREIGN PATENT DOCUMENTS

| | | |
|---|---|---|
| EP | 0413457 A1 | 2/1991 |
| EP | 0 511 129 A1 | 10/1992 |
| GB | 1060155 | 3/1967 |
| GB | 1115305 A | 5/1968 |
| JP | 00462761 | 1/1971 |
| JP | 60119296 | 12/1983 |
| JP | 61-293231 | * 12/1986 |
| JP | 05200745 | 8/1993 |
| WO | WO 94/12347 | 6/1994 |
| WO | WO9720006 A2 | 11/1996 |

Primary Examiner—Katherine A. Bareford
(74) Attorney, Agent, or Firm—Fulbright & Jaworski L.L.P.

(57) ABSTRACT

A system and a method for coating two sides of a laminate material is disclosed in which one side of the laminate material is coated with one substance and the second side is coated with a similar or different substance. Reverse roll coating may be used to coat the two surfaces of the sheet of laminate material. The method described is particularly suited for applying a substance providing balancing characteristics desirable in the end product to one side of the laminate material and applying a substance providing other characteristics desirable in the end product to the other side of the laminate material. For example, a balancing substance may be applied on one side of a kraft paper sheet and a substance providing structural bonding applied to the other side, thereby eliminating the need to use a discrete balancing sheet in a laminate. The kraft sheet thus coated may be used to form a laminate panel that may be applied on an exterior wall, an interior wall, siding, a roof top, a facade boarding, a counter top, a table top or a work top.

27 Claims, 4 Drawing Sheets

U.S. PATENT DOCUMENTS

| | | | |
|---|---|---|---|
| 3,900,690 A | 8/1975 | Schwarz | 428/447 |
| 3,936,582 A | 2/1976 | Keiser | |
| 3,983,307 A * | 9/1976 | Power et al. | 428/503 |
| 4,064,297 A * | 12/1977 | Power et al. | 428/86 |
| 4,158,712 A * | 6/1979 | Degens | 428/212 |
| 4,172,160 A | 10/1979 | Stoner, III | 427/178 |
| 4,177,304 A | 12/1979 | Berry | 427/434 R |
| 4,244,990 A | 1/1981 | Mayerhoffer | 427/211 |
| 4,311,748 A | 1/1982 | Casey et al. | 428/204 |
| 4,354,449 A | 10/1982 | Zink | 118/126 |
| 4,358,481 A | 11/1982 | Wallstén | 427/211 |
| 4,391,833 A | 7/1983 | Self et al. | 426/523 |
| 4,473,613 A | 9/1984 | Jaisle et al. | 428/220 |
| 4,499,125 A | 2/1985 | Blasing et al. | |
| 4,510,199 A | 4/1985 | Brook | |
| 4,533,600 A | 8/1985 | Coughlan et al. | |
| 4,609,589 A * | 9/1986 | Hosoda et al. | 428/352 |
| 4,629,634 A * | 12/1986 | Coughlan et al. | 427/179 |
| 4,657,783 A | 4/1987 | Tatt et al. | 427/211 |
| 4,822,640 A | 4/1989 | Tuhkanen et al. | 427/211 |
| 4,853,255 A | 8/1989 | Onishi et al. | 427/148 |
| 4,961,964 A | 10/1990 | Dahlgren | 427/211 |
| 5,084,318 A * | 1/1992 | Stirling et al. | 428/63 |
| 5,089,296 A | 2/1992 | Bafford et al. | 427/208 |
| 5,395,690 A * | 3/1995 | Kawahata et al. | 428/355 |
| 5,492,722 A | 2/1996 | Tait et al. | 427/211 |
| 5,510,161 A | 4/1996 | Lloyd | |
| 5,714,269 A | 2/1998 | Muñoz Madrid | 428/500 |
| 5,753,871 A | 5/1998 | Kahara et al. | |

* cited by examiner

| CONDITION | DAY | PRIOR ART FLOORING BACKER | MELAMINE/ PHENOLIC BACKER |
|---|---|---|---|
| ROOM | 0 | 0.35 | −0.69 |
| 90% R.H. 72° F | 1 | 0.81 | −0.03 |
| | 2 | 0.79 | −0.06 |
| | 3 | 0.92 | −0.13 |
| | 4 | 0.79 | |
| | 5 | | |
| | 6 | | −0.16 |
| | 7 | 0.83 | −0.19 |
| 10% R.H. 72° F | 8 | 0.31 | −1.38 |
| | 9 | −0.06 | −1.38 |
| | 10 | −0.05 | −1.38 |
| | 11 | −0.10 | |
| | 12 | | |
| | 13 | | −1.44 |
| | 14 | −0.16 | −1.38 |
| RANGE OF MOTION | | PRIOR ART FLOORING BACKER | MELAMINE/ PHENOLIC BACKER |
| | MAXIMUM | 0.92 | −0.03 |
| | MINIMUM | −0.16 | −1.44 | ns
SYSTEM AND METHOD FOR TWO SIDED SHEET TREATING

RELATED APPLICATIONS

The present application is related to concurrently filed, co-pending and commonly assigned U.S. patent application Ser. No. 09/267,180, now abandoned, entitled SYSTEM AND METHOD FOR TWO SIDED SHEET TREATING, the disclosure of which is incorporated herein by reference.

TECHNICAL FIELD

The present invention relates generally to the manufacture of laminated products such as may be used for decorative flooring, counter and table tops, and wall panels, and more specifically to systems and methods for manufacturing such products by applying a coating of the same or different materials on opposing sides of a laminate material.

BACKGROUND

The ability to replicate natural materials has substantially improved over the years. For example, decorative laminates have replaced natural materials in the construction of furniture, cabinets, counter tops, flooring panels and other surfaces. In each of these applications, a decorative surface may be applied to a core layer or substrate, namely, plywood, particle board, chipboard, medium density fiberboard, etc. Often, a backing layer is secured to the opposite surface of the substrate to balance the laminates or provide other benefits.

Generally, the decorative surface and the backer layer will include one or more kraft paper layers which are adhesively laminated together using various materials, such as melamine formaldehyde and phenolic resins. As shown in FIG. 1, a high pressure laminate 11 may comprise a very thin overlay sheet 12 impregnated with melamine resin, a decorative sheet 13 disposed thereunder, and sheets 14 and 15 of kraft paper impregnated with phenolic resin disposed below the decorative sheet.

The melamine impregnated overlay sheet 12 forms a hardened layer on the surface of the decorative sheet. This hardened layer of the decorative laminate is used to protect the surface of laminate 11, such as by making the laminate scratch and abrasion resistant. The melamine impregnated overlay also prevents discoloration or deformity of the laminate surface due to various external factors, such as high pressure and temperature and other ordinary stresses which occur in the environment where such laminates are typically used. Furthermore, the overlay sheet is also capable of easily withstanding the thermal or chemical strains occurring in these environments. For example, the melamine overlay sheet protects the laminate from discoloring when a very hot substance, such as tea or coffee, or a very cold substance, such as ice, spills on the surface of such a laminate. Thus, the melamine coating can withstand the very high and very low temperatures to which the laminate is exposed in everyday use.

However, the overlay sheet 12 itself may cause warping of the laminate panel under extreme hot, cold, or dry conditions. The conventional substrate or core layer 16 may not be able to withstand the pressure created by the movement of the melamine overlay of the decorative surface under these extreme conditions and may deform, delaminate, or in extreme cases, break due to the pressure exerted by the melamine overlay layer 12. Therefore, backer type laminates may be used for many applications, such as to provide balancing sheets on the bottom of decorative laminates. These backer laminates may comprise a discrete melamine impregnated balancing layer 19 to balance the melamine layer of the decorative surface, and sheets of phenolic resin impregnated kraft paper 17 and 18 to correspond to the layers in the decorative laminate. The balancing layer 19 used in prior art systems is similar to the overlay sheet 12 of the decorative surface and uses the same material as the overlay sheet. However, the balancing layer 19 may or may not be transparent as it is usually not visible. 12. The discrete melamine impregnated balancing layer 19 when used in a backer laminate prevents warping of the laminate due to the movement of the melamine layer 12 of the decorative surface under extreme conditions.

Typically, in prior art systems, sheets of kraft paper are impregnated with phenolic resin by submerging them in a vat which is filled with phenolic resin and then curing the phenolic resin impregnated kraft paper. The kraft paper soaks up a desired amount of phenolic resin based on the time it is left in the vat and the level of submergence. This method of impregnating the kraft paper is generally not cost effective as it requires large vats providing substantial resin pool surface areas in order to allow the proper immersion of a portion of a continuous roll of kraft paper. These large pool surface areas result in wasteful use of phenolic resin as the large vat surface area is prone to collection of contaminants and to the escaping of resin vapors thus causing variations in the percentage of solids and/or other controlled attributes of the resin requiring substantial portions of the resin to be disposed of from time to time. Moreover, when the resin impregnated kraft paper is being manufactured using such vats, fumes are created during the process which are harmful to the workers in the vicinity of the manufacturing process. All of this is compounded by the fact that such vats of phenolic resin, or other resins, are difficult to clean requiring an inordinate amount of time to properly clean the vats that have been used for impregnating the kraft sheets with phenolic resin.

The melamine impregnated sheet used in the decorative and backer layers is usually not a kraft paper sheet but rather a very thin sheet specifically adapted, such as by controlling strand orientation, density, and porosity to carry the melamine resin. Kraft paper sheets are typically not suitable to act as a carrier for melamine because the porosity, strand orientation, and density of kraft paper sheets are not adapted for this purpose although they are well suited for phenolic resin impregnation. Typically, a suitable sheet is impregnated with melamine by coating both sides of the sheet with melamine formaldehyde resin and then removing excess resin from the sheet. The melamine formaldehyde coated sheet is cured under controlled conditions to produce the melamine impregnated sheet which may be used both in decorative and backer laminates.

The laminates which are manufactured by using the phenolic resin impregnated kraft paper sheets and the melamine impregnated sheets as described above are made by a bulky manufacturing press which is expensive to operate. Thus, it is not cost effective or desirable to use the press to produce individual laminates. Therefore, in the typical manufacturing process a plurality of laminates are produced from each press during each press cycle to make the most efficient use of the press.

Typically, in such a press system pairs of laminate assemblies, similar to the laminate assembly shown in FIG. 1, with or without pattern layer 13, are positioned back-to-back with the phenolic resin impregnated kraft paper sheet 15 of one laminate assembly facing the phenolic resin impregnated kraft paper sheet of a second laminate assembly with a discrete release sheet disposed there between as described below. These pairs of laminate assemblies are separated from other laminate assembly pairs by metal sheets or press plates. Usually during the manufacturing process each laminate assembly 11 also includes a sheet, known as release sheet. The release sheet is usually kraft paper which has been coated with a release agent on at least one side. This release sheet is placed at the end of each laminate assembly adjacent to the phenolic resin impregnated kraft paper layer 15 away from the press plates to provide a release mechanism between the paired laminate assemblies. The release sheet facilitates easy separation of the laminate assemblies after pressing as the release agent will not allow cross linking of the laminate assemblies at least with respect to the side of the laminate assembly to which the release sheet is applied.

Typically these laminate assemblies are subjected to a pressure and temperature for a time sufficiently long enough to cure the laminating resins impregnating the respective layers. The high temperatures and pressure cause the resins within the sheets to flow which consolidates the whole into an integral mass. Thus, typically the discrete melamine layer sticks to the phenolic resin impregnated kraft paper layer disposed adjacent to it due to the migration of the phenolic resin into at least a portion of the discrete melamine layer to provide structural cross linking. Accordingly, the melamine sheet generally adds to the thickness or bulk of the laminate.

The conventional laminates produced by the above described prior art systems may then be cut to size and employed in a variety of applications such as decorative surfaces for desktops, tabletops, wall panels, and the like such as by bonding them to a core layer or substrate with a conventional adhesive such as contact cement. These laminates may also be used as backer layers common in laminated flooring products.

When such a laminate is used as a decorative laminate, the melamine layer in the laminate may be used to protect the surface of the decorative laminate. As mentioned above, however, such a use of a melamine layer on a decorative side of a laminate may necessitate the use of a melamine layer on a backer to provide balancing. When such a laminate is used as a backer laminate, the melamine impregnated sheet acts mostly as a carrier for melamine in order to provide a melamine layer to counteract the stress created by the melamine sheet of the decorative laminate to prevent warping of the laminate.

The use of a discrete melamine sheet during pressing of laminate assemblies as described above presents certain disadvantages. The melamine sheet itself contributes substantially to the material cost of the manufactured laminate as the melamine sheet is generally more expensive than the kraft paper sheets. As discussed above, kraft paper is not a good carrier of melamine. Thus, a different kind of thin sheet is usually adapted to provide the necessary strand orientation, density, and porosity, to enable it to act as a carrier for melamine. This requires a complete additional processing step to provide a discrete sheet coated with melamine. Also, as the melamine sheet of prior art systems is very thin, it may easily be damaged during handling, resulting in substantial losses due to handling spoilage. Furthermore, as the melamine sheet is an additional sheet that has to be processed, there are substantial processing costs, such as handling and collating costs, scrap losses due to the brittle and difficult to handle nature of the melamine impregnated sheet, in addition to the costs associated with impregnating the sheet itself with melamine. Furthermore, in case of backer laminates, the translucent character of the overlay sheet, although present due to the same sheet being used for providing a decorative overlay being used for backer purposes, is not generally necessary.

Moreover, in order to achieve the desired thickness of the laminate assembly and still allow the use of a discrete melamine sheet, more sheets of thinner material instead of fewer sheets of thicker material have to be used. This increases the manufacturing overhead as a greater number of sheets have to be handled and processed before they can be used in the laminate assembly. Such handling and processing may include impregnating the sheets with phenolic resin, cutting the sheets to the desired size, and collating the sheets for subsequent pressing.

Furthermore, since the overlay sheet becomes part of the laminate after pressing, at least one sheet of the laminate does not include phenolic resin saturation to provide structural bonding, but rather relies on migration of the resin from an adjoining sheet. Thus, prior art systems do not provide consistent structural bonding between the different layers of the laminate as the phenolic resin saturation of at least one layer is less than the other layers. Therefore, the structural bond between different layers of the laminate assembly are not the same and may result in earlier delamination of a layer of the laminate.

It should be clear that the use of the melamine impregnated sheet contributes substantially to the cost of the manufactured laminate and also adds to the product cycle time. Not only are there raw material costs involved with the use of a separate melamine sheet, but also substantial undesirable processing costs are inherent with such a use.

Thus, there is a need in the art for a system and method of manufacturing laminates using the advantages offered by melamine impregnated sheets as a discrete sheet in laminates without introducing unnecessary costs, handling steps, or structural disadvantages attendant with the use of prior art discrete melamine sheets.

SUMMARY OF THE INVENTION

These and other objects, features and technical advantages are achieved by a system and method for coating different surfaces of laminate material, such as a sheet of kraft paper, with materials having desired characteristics.

Accordingly, in a preferred embodiment of the present invention, one side of a sheet, such as a kraft paper or other laminate material used in constructing a laminated product, is coated with a substance providing first desired characteristics. For example, it may be desirable that a backer layer of a laminated product contain a laminate material impregnated or coated with a substance to balance or counteract the pressure created by a layer of the decorative side that has been impregnated or coated with the same substance to protect the laminated product from strains associated with everyday use of such products. Such strains may include scratches, nicks, marks and other stresses that are present in the environment where the laminate is typically used. Therefore, in a preferred embodiment of the present invention, a laminate material, such as kraft paper, used in such a backer layer, is coated or impregnated with such a substance to provide the desired characteristics to the laminate. For example, melamine may be used to coat one side of the kraft paper, to provide the desired balancing (and/or protective) characteristics to the kraft paper. Moreover, certain acrylics, polyesters, and water-based thermosetting resins may also be used to provide the desired balancing (and/or protective) characteristics.

According to this embodiment of the invention, another side of the kraft paper is coated with a substance providing second characteristics desirable in the end product. For example, with laminates it may be desirable to coat an opposing side of the kraft paper with phenolic resin in order to provide desired mechanical bonding with additional layers of kraft paper or other laminate material. Other non-limiting examples of substances that may provide the desired mechanical bonding include melamine formaldehyde, PVA, acrylic resins, polyester resins, and water based thermosetting resins.

Although described above with respect to the use of melamine as providing a desired balancing (and/or protective) characteristic, it should be appreciated that any substance providing desired characteristics may be used without departing from the spirit of the present invention. Likewise there is no limitation to the use of phenolic resin on a second side of the laminate material and any material providing characteristics desirable in the end product may be used. Also, if desired, the second side of the sheet may be left uncoated.

Preferably, reverse roll coating in which a roll of paper is unwound and passed over a series of rollers such that one side of the paper is treated with a substance providing first desired characteristics and the other side is treated with a substance providing second desired characteristics, is used to provide precisely controlled application of desired substances to the laminate material. However, although reverse roll coating is used in a preferred embodiment, any process suitable for precisely treating different surfaces of a laminate material may be used according to the present invention.

The present invention provides advantages not available in the prior art. For example, the laminate material so treated serves the function of a balancing sheet in a laminate assembly, eliminating the need for a separate melamine sheet such as in the backer layer of a laminate. Also, if desired the laminate material may be used in a decorative laminate to provide desired protective characteristics to the laminate. This sheet of laminate material may then be laminated with other laminate material sheets to manufacture a laminate of the desired thickness and having the desired characteristics. Thus, the overhead associated with the raw material costs, handling, and coating of the discrete melamine impregnated sheets of the prior art is eliminated while providing desired attributes in the laminated assembly. For example, the preferred embodiment wherein phenolic resin is provided on a side of this sheet results in a final sheet in the laminate assembly having structural attributes consistent with those of the other laminate materials of the laminate assembly due to this sheet utilized for providing the balancing (and/or protective) functionality also having the phenolic resin.

Moreover, the kraft paper sheet, which is coated on both sides with different or same substances according to the preferred embodiment of the present invention, itself is less expensive than the balancing (and/or protective) sheet used in prior art systems. Also, other thicker sheets of kraft paper may be used instead of the thinner sheets of kraft paper used in prior art systems because there is no need to account for the thickness of the balancing sheet in the manufacture of the laminate. These thicker sheets, including the less expensive coated sheet of the preferred embodiment, are easier to handle than the thinner sheets, and are less easily torn, thus reducing wastage due to scrap during handling. Furthermore, fewer sheets are now required to be cut to the desired size and there is less handling and lay up costs at the laminate manufacturing plant.

The present invention also provides more control of the final thickness of the laminate since the thickness of the laminate materials used may now be selected without concern for the thickness of a balancing sheet which must be accounted for in the total thickness of the laminate assembly but which cannot be relied upon for providing the mechanical integrity of the sheets treated to provide the above mentioned cross linking.

Therefore, it is an object of the present invention to provide a system and method for coating a sheet with different materials on different surfaces of the sheet.

It is another object of the present invention to coat one surface of a sheet with a material to provide first desirable characteristics and at the same time to reduce the manufacturing steps required for an end product and/or the cost of the end product.

It is a further object of the present invention to coat another surface of the sheet with a different or similar substance to provide second characteristics that are desirable in the end product.

It is a further object of the present invention to coat one surface of a sheet with a material to provide desirable balancing and/or protective characteristics and at the same time to reduce the manufacturing steps required for an end product and/or the cost of the end product.

It is a further object of the present invention to provide a single sheet with first characteristics and second characteristics desirable in the end product thereby providing both benefits in a single sheet and at the same time reducing costs associated with wastage and handling of the sheets.

It is a still further object of the present invention to provide a system and method for two sided coating a kraft paper such that one side is coated with a balancing agent and the other side is coated with a bonding agent thereby eliminating the need to use balancing sheets in a laminate to provide a more cost efficient manufacturing process.

It is a still further object of the present invention to reduce the cost of producing laminates and also to reduce the production cycle by eliminating steps from the manufacturing process of the prior art.

It is a still further object of the present invention to provide a method and system of producing laminates without the need to use discrete balancing sheets.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
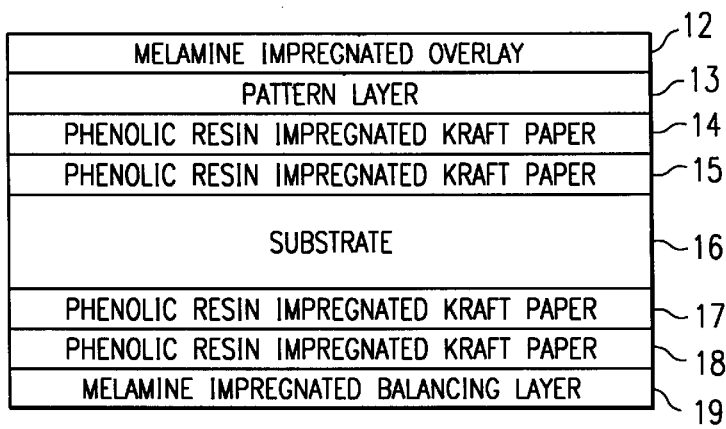
FIG. 1 shows a schematic of a laminate assembly with the different layers of laminate material.
Figure 2:
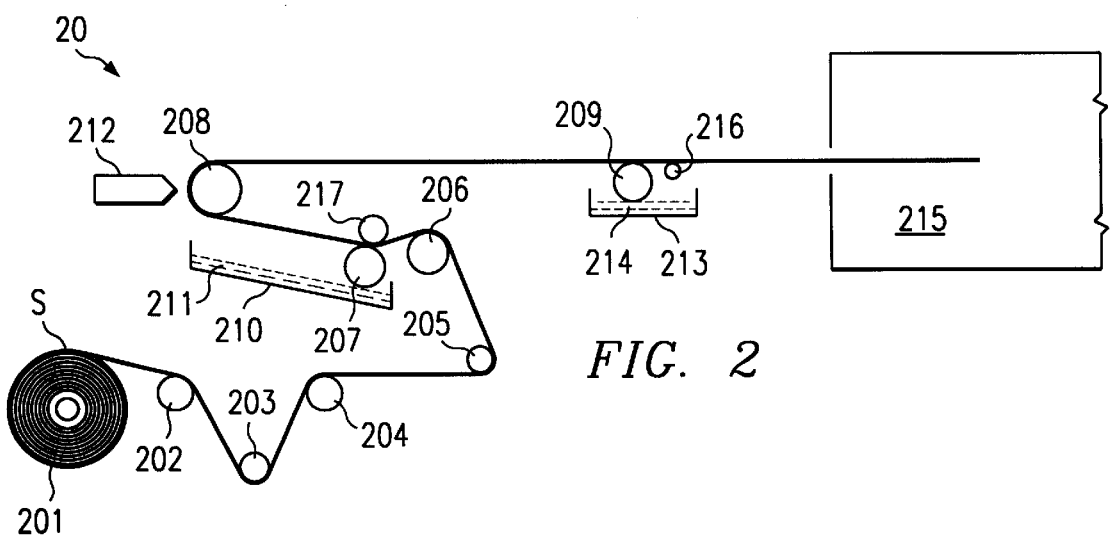
FIG. 2 shows a system for reverse roll coating a sheet with two substances on different surfaces of the sheet.

FIG. 2 shows a preferred system 20 for applying substances to opposing surfaces of a sheet S. The system comprises, a sheet S in the form of a roll 201, a series of rollers 202, 203, 204, 205, 206, 207, 208, 209, and 217, two pans 210, 213, metering devices 212, 216 and a curing device 215 such as may be an oven for applying a controlled amount of heat for subsequent curing of a coating substance. Pans 210 and 213 contain substances 211 and 214, respectively. Substances 211 and 214 may be the same substance or they may be different substances that are applied on different surfaces of sheet S. Metering devices 212 and 216 control the amount of substance 211 and substance 214, respectively, remaining on sheet S.

Sheet S is unwound and passed along rollers 202, 203, 204, 205, 206, 207, 208, 209 and 217 to curing device 215. Rollers 207 and 209 are coating rollers adapted to rotate within pans 210 and 213. Coating roller 207 which is adapted to be partly or totally submerged in substance 211 contained in pan 210 may be used to coat one side of sheet S. Similarly, coating roller 209 which may be adapted to be partly or totally submerged in substance 214 contained in pan 213 may be used to coat the other side of sheet S. Rollers 202, 203, 204, 205, 206 maintain a uniform tension on the surface of sheet S and prevent it from slacking and/or tearing. The tension on sheet S may be varied by adjusting the speed of the rollers and/or the pressure exerted thereon by idler rollers 202, 203, 204, 205, and/or 206. Although a series of rollers 202, 203, 204, 205, 206, 207, 208, 209 and 217 are shown in the preferred system, the operation of the present invention does not require that all these rollers be used. For example, only select ones of these rollers may be provided depending on the desired tension and pressure to be applied on sheet S.

Substance 211 is fed into pan 210 by means of a pump (not shown). The level of substance 211 in pan 210 may be controlled by the pump such that the pump automatically feeds more substance 211 to pan 210 whenever substance 211 falls below a certain level. Roller 207 may be submerged in substance 211 up to a desired level depending on the amount of substance 211 needed to coat one side of sheet S. Moreover, the desired amount of substance 211 to be coated on one side of sheet S may also be controlled by the pump. Thus, when coating roller 207 rotates in pan 210, the surface of roller 207 is coated with substance 211 and when the first surface of sheet S comes in contact with roller 207, roller 207 coats the first surface of sheet S with the desired amount of substance 211. Moreover, by controlling the speed of the rollers the amount of time that different parts of sheet S remain in contact with roller 207 may be controlled, thus, further controlling the amount of substance 211 that is applied to different parts of sheet S. Similarly, by increasing/ decreasing the pressure at which sheet S engages roller 207, the amount of substance 211 that is applied may be varied. This pressure may be adjusted, for example, by adjustment to the aforementioned tension of sheet S.

Furthermore, as shown in FIG. 2, sheet S passes between coating roll 207 and roller 217 such that one surface of sheet S is in contact with roller 207 and the other surface is in contact with roller 217. Roller 217 may be used to apply pressure on sheet S, to ensure that sheet S touches coating roller 207. Since the position of roller 217 is preferably adjustable it may be used to control the amount of substance 211 to be coated on sheet S. Roller 217 may also be used to apply pressure on sheet S such that substance 211 pentrates sheet S upto a desired level. Also, if desired, the position of roller 217 may be adjusted such that it does not apply any pressure on sheet S and thus sheet S may totally bypass substance 211. That is, by adjusting the position of roller 217, one surface of sheet S may be left uncoated.

Figure 7:
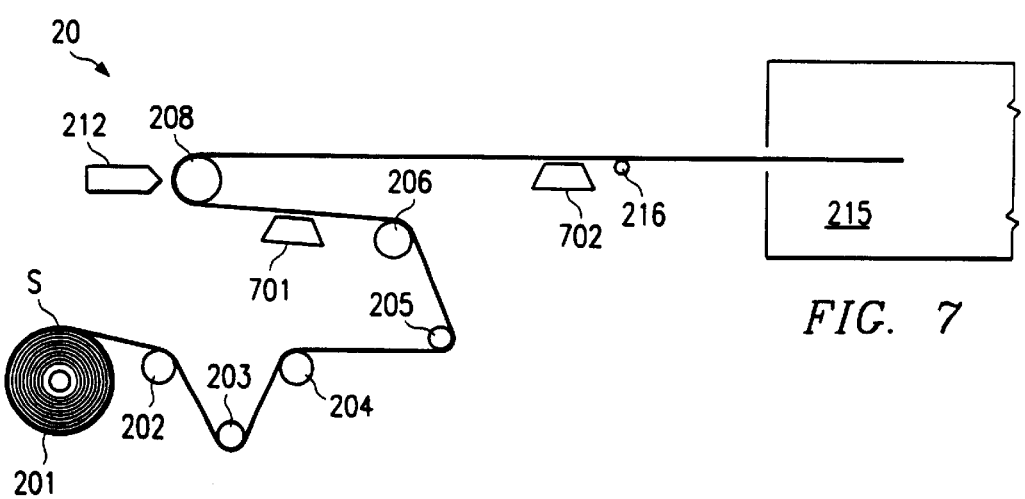
FIG. 7 shows an alternative embodiment of a system for reverse roll coating a sheet with two substances on different surfaces of the sheet.

Although described in the preferred embodiment as sheet S coming into contact with roller 207, it should be appreciated that operation of the present invention does not require such contact. For example, roller 207 may be adapted to transfer coating material without contact to sheet S, such as through the use of rotational speeds sufficient to eject coating material onto the surface of sheet S. Additionally or alternatively, non-roller coating techniques may be used, such as the use of spray nozzles, brush bristles, or the like. FIG. 7 provides an embodiment of system 20 wherein spray nozzles 701 and 702 are used to coat sheet S.

In the preferred embodiment illustrated, sheet S passes around roller 208 which is positioned after roller 207 and changes the orientation of sheet S such that the second side of sheet S touches coating roller 209. Metering device 212 preferably located near roller 208 in order to take advantage of the disposition of the surface of sheet S provided thereby, may be used to further control the amount of substance 211 remaining on sheet S. Thus, once sheet S has been coated on one side, the amount of substance 211 remaining on sheet S may be further and precisely controlled to maintain a desired amount of the substance on the surface of sheet S. Thus, if desired, metering device 212 may be adjusted, such as by being moved towards roller 208, thereby reducing the amount of substance 211 remaining on sheet S. The excess of substance 211 that is removed from sheet S is preferably caught in pan 210. On the other hand, if desired, the amount of substance 211 remaining on sheet S may be increased by adjusting metering device 212, such as by increasing the distance of metering device 212 from roller 208. Furthermore, metering device 212 may be used to achieve a desired penetration of substance 211 into sheet S, such as by adjusting device 212 to apply pressure to the sheet surface.

According to the illustrated embodiment, sheet S is made to pass over coating roller 209 such that the second surface of sheet S touches coating roller 209. Coating roller 209 is located such that, if desired, it may be submerged partially or totally in substance 214 contained in pan 213. Substance 214 is fed into pan 213 by means of a pump (not shown). The level of substance 214 in pan 213 may be controlled by the pump, such that when coating roller 209 rotates in pan 213, the surface of roller 209 is coated with a desired amount of substance 214. Thus, when the second surface of sheet S comes in contact with roller 209, roller 209 coats the second surface of sheet S. Moreover, by varying the speed of the rollers the amount of time that a particular portion of sheet S remains in contact with roller 209 may be controlled, thus, controlling the amount of substance 214 that is applied to sheet S. As with roller 207 described above, there is no limitation to the use of contact between roller 209 and sheet S in coating the second surface of sheet S. Additionally, also as described above with respect to roller 207, non-roller techniques may be utilized to coat the second surface of sheet S.

A second metering device 216 is preferably provided in close proximity to coating roller 209 to precisely control the amount of substance 214 remaining on the second side of sheet S. Therefore, if desired, sheet S may be passed over metering device 216 such that the second surface of sheet S touches metering device 216. Although shown in the preferred embodiment of FIG. 2 as a different embodiment than metering device 212, metering device 212 and 216 may be similar mechanisms, if desired. Additionally, metering device 216 may be disposed near a reverse roller, as is metering device 212, disposed after roller 208 and/or metering device 216 may be disposed at a location other than near a reverse roller, if desired.

Sheet S is then preferably subjected to a B-curing process or other conditioning step to preferably condition substances 211 and 214, such as by drying or curing. For this purpose, sheet S may be passed through a conditioner 215. In one embodiment where sheet S comprises kraft paper, such subjecting of kraft paper to condition 215 may involve controlling a rate at which said kraft paper is passed through conditioner 215. The environment inside conditioner 215 may be controlled such that, if desired, different temperatures, pressures, catalysts, or the like may be maintained on opposite sides of sheet S or at different points within conditioner 215, to facilitate efficient curing of substances 211 and 214. Since substances 211 and 214 may be different substances, it is desirable to control the environment inside conditioner 215 such that substance 211 and substance 214 are cured based on their respective desired characteristics. For this purpose, different heating elements, for example, may be provided in different parts of conditioner 215 such that one part of conditioner 215 is more suitable for curing substance 211 and another part of conditioner 215 is more suitable for curing substance 214. For example, when a water based resin, such as melamine, is used as substance 211, it may be desirable to keep a portion of the coated melamine on the surface of sheet S and thus it may be desirable to cure melamine more rapidly such as by exposing the melamine to a higher temperature initially. Accordingly, different heating elements may be provided on different sides of sheet S to heat the two surfaces differently. For example, a cooling surface may be provided on the first side and a heating surface may be provided on the second side.

Furthermore, if desired an optimum temperature or other conditioning attribute, which when applied in combination with the precisely controlled application of each coating material according to the present invention, may be calculated such that both substance 211 and substance 214 are cured to an acceptable degree. The acceptable degree of curing may be determined based on the ultimate use of sheet S. For example, it might be acceptable to cure substance 211 on the first side of sheet S to a lesser degree in order to obtain a better curing of substance 214 applied to the second side of sheet S depending on the particular application.

Although, conditioner 215 has been described as a single apparatus, a series of apparatus may be used to achieve the desired curing of the substances, if desired. For example, the series of apparatus may be a combination of conditioners, refrigerators, wetting devices, drying devices etc. Moreover, it may be desirable to control a combination of conditions, such as the temperature, pressure, moisture level, etc., inside conditioner 215 to achieve a desired result, such as a desired penetration level of sheet S by either or both of substances 211 and 214.

In the preferred embodiment, sheet S is a laminate material, such as kraft paper, that is used in the manufacture of laminates, such as decorative laminates and/or backer layers. Furthermore, although sheet S is preferably wound in the form of a roll, for purposes of this invention it is not necessary that the sheet be so wound.

As noted, substance 211 may be any substance. However, in the preferred embodiment, substance 211 is a substance providing first desired characteristics to an end product. For example, it may be desirable that a laminate material be coated with a substance to balance or counteract another layer of the laminate. Typically, a protective layer is used to protect the laminate from the affects of strains, such as may be caused by extreme hot, cold, and dry conditions in the environment where the laminate is generally used. This protective layer may be coated, for example, with a substance, such as melamine formaldehyde resin, to provide the desired protective characteristics. However, this protective layer may cause warping of the laminate that may result in delamination or even breaking of the laminate. Therefore, it may be desirable that a balancing layer be used to counteract or balance the protective layer to prevent such warping. Thus, a laminate material of the preferred embodiment, such as kraft paper, may be coated with a substance, such as melamine, to provide the desired balancing characteristics. This coated sheet may then be used in a backer to balance or counteract the protective melamine sheet, thereby eliminating the need to use a discrete melamine sheet as a balancing sheet as is done in the prior art.

Although melamine has described above as the preferred substance to provide balancing, any substance that provides such a characteristic may be used. For example, certain acrylics, polyesters, and water based thermosetting resins may be used to provide the desired balancing characteristics. Moreover, the scope of the present invention is not limited to a substance that provides a balancing characteristic, and any substance that provides first desired characteristics may be used.

Similarly, substance 214 may be any substance. In the preferred embodiment, substance 214 is a substance providing second desirable characteristics in the end product. For example, in a laminate it is often desirable that the layers of a laminate assembly be coated with phenolic resin to provide structural bonding with other laminate materials. Thus, in the above example sheet S is coated on one side with a substance, such as melamine, providing first desired characteristics and on the other side with a substance, such as phenolic resin, providing second desirable characteristics, and therefore, in the above example, substances 211 and 214 are different substances. Other non-limiting examples of substances that may provide the desired structural bonding include melamine formaldehyde, polyvinyl acetate, acrylics, polyesters, and water based thermosetting resins.

Metering device 212 may be any device capable of precisely controlling the amount of substance 211 that remains on the first side of sheet S. In the preferred embodiment, metering device 212 is an air knife which is used to manipulate the coating on the first side of sheet S, i.e. to precisely control the amount of coating material remaining on the surface by removing excess coating of substance 211 from the first surface of sheet S. Thus, in the preferred embodiment, metering device 212 comprises a sheet of air projected under pressure at an angle from a slot-shaped air nozzle onto the coated surface of sheet S. Thus, while sheet S is supported on a moving support such as reverse roller 208, the sheet of air is projected onto sheet S so that the air strikes sheet S at an angle such that a desired amount of substance 211 may be removed from sheet S.

The amount of substance 211 remaining on sheet S may be adjusted by controlling how much air is blown across the surface of sheet S, the force of the air blown across the surface of sheet S, the angle at which the sheet of air strikes the surface of sheet S, and/or the time during which the air knife engages the surface of sheet S, i.e. the speed at which the sheet is moved past the air knife and/or the time transpiring between the application of the coating substances and the engaging of the air knife. For example, by increasing the distance of metering device 212 from roller 208 the amount of substance 211 remaining on the first side of sheet S may be increased due to the striking force of the sheet of air of the preferred embodiment air knife, against the surface of sheet S being reduced. Accordingly, the preferred embodiment includes, a set of screw adjusters which are provided at the end of metering device 212 to adjust its distance from sheet S. However, any means may be used to adjust the distance of the metering device from the surface of sheet S, e.g., a pneumatic mechanical adjuster, an eccentric and follower, an electrically powered adjusting means such as a computer controlled servo mechanism, etc.

Furthermore, the air pressure applied by the preferred embodiment metering device 212 may be adjusted to further control the amount of substance 211 that remains or that penetrates sheet S at a particular advance speed of sheet S through the coating apparatus. For example, when a balancing (and/or protective) substance is coated on the first side of sheet S, it is desirable that a portion of the substance stay on the surface of sheet S and another portion of the substance penetrate sheet S upto a desired level to provide the desired properties to the sheet. Thus, by controlling the air pressure applied by metering device 212 to between 0.25–5 psi at an advance rate of 5–300 ft/min for sheet S, a portion of the melamine balancing substance of a preferred embodiment may be maintained on the surface of the sheet, and another portion of the melamine balancing substance may be allowed to penetrate the sheet.

The level to which substance 211 penetrates sheet S may be further controlled by adapting substance 211, such that a desired amount of substance 211 may penetrate through the pores present in sheet S upto a desired level. For example, by selecting solids or other particles of different sizes to be used to form substance 211, a desired level of penetration of sheet S by substance 211 may be obtained. Thus, a resin such as a melamine formaldehyde that penetrates sheet S upto a desired level may be used as substance 211. Thus, when particles of relatively small size are used, substance 211 may be allowed to penetrate deeper into sheet S, than if particles of relatively large size were used. Furthermore, different solids may be used in substance 211 depending upon the porosity of sheet S to achieve a desired penetration level of substance 211 and also to prevent substance 211 from penetrating sheet S to such a level that would prevent the desired penetration of sheet S by substance 214.

Moreover, as traditional kraft paper sheets are not designed to allow coating with melamine, the melamine may be treated further, if desired, by other substances to allow coating a kraft paper sheet with the desired amount of melamine. For example, melamine may be treated with coating or wetting agents, such as ethylene glycol, cellulose, polymer acrylamides, water based thermosetting resins, and the like, to allow it to stick to the surface of kraft paper such as by changing the surface tension of melamine or providing a carrier which is wicked by the fibers of the kraft paper. Thus, if desired, both coating or wetting agents, and the solid particles discussed above may be used to allow a desired portion of the substance 211 to stay on the surface of sheet S and also to allow a desired amount of substance 211 to penetrate sheet S upto a desired level.

Figures 4, 5:
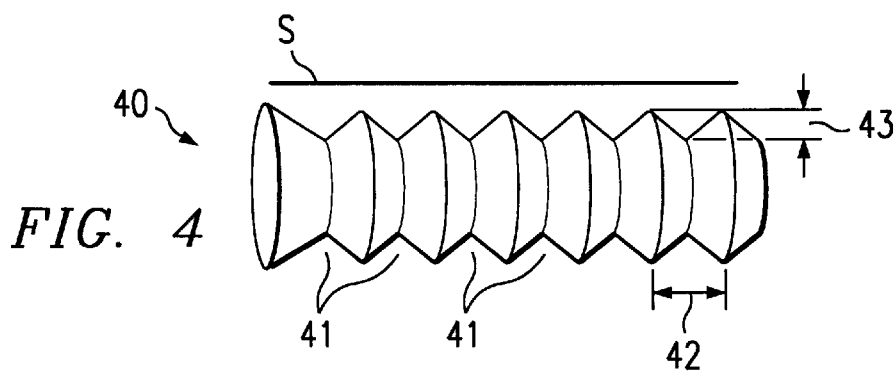
FIG. 4 shows a schematic of a preferred embodiment metering device adapted for use according to the present invention.
FIG. 5 is a table comparing the results of experimental testing performed on the sheet of FIG. 3 with a prior art laminate material.

Metering device 216 of the preferred embodiment illustrated in FIG. 2 is in the form of a bar or rod 40 shown in FIG. 4, that drags on the surface of sheet S. Grooves 41 may be provided on metering device 40 such that when sheet S passes over rod 40, some amount of substance 214 may be removed from sheet S. By changing the spacing 42 of the grooves 41 on the metering device, the amount of substance 214 remaining on sheet S may be further controlled. For example, when the metering device has no grooves and is substantially smooth, a large amount of substance 214 may be removed from sheet S. On the other hand, by providing grooves on metering device 216 and selecting their size 43 and spacing 42, the amount of substance 214 removed from sheet S may be decreased. Although, metering device 216 (of FIG. 2) described above has been discussed with respect to a rod with grooves, any device capable of producing the desired precise control of coating material may be used for this purpose.

It is desirable that a portion of the preferred embodiment balancing substance stay mostly on the surface of the kraft paper to counteract the preferred embodiment protective coating, a portion of which stays on the surface of the decorative laminate to provide a scratch and abrasion resistant layer. Therefore, metering device 212 is preferably an air knife because an air knife has been found to provide far superior accuracy as compared to other metering devices, such as the above described bar with grooves. On the other hand, it is desirable that the preferred embodiment phenolic formaldehyde resin penetrate sheet S such that it impregnates sheet S upto a desired saturation level of approximately forty percent resin content while not saturating the sheet to a point that the second substance is contaminated, repelled, or otherwise adversely affected. Therefore, metering device 216 is preferably a bar with grooves as the grooved bar also facilitates impregnating sheet S with phenolic resin upto the desired level. It should be appreciated that according to the present invention, the two substances may or may not intermix with each other depending on the desired characteristics.

As mentioned above, the speed of the rollers or other mechanism for controlling the throughput of sheet S may be controlled to coat the sheet with a desired amount of substances 211 and 214. In the preferred embodiment, the rollers rotate at 5–300 ft/min so that the desired amounts of substances 211 and 214 may be applied to the sheet.

Furthermore, due to the application of substance 211 on the first surface of sheet S, sheet S might curl or otherwise be physically altered before it is coated with substance 214 on the second surface. Fibers and fiber clearances on the coated side of sheet S may contract more than those on the uncoated surface when substance 211 is applied to the first surface. Thus, sheet S might curl with the coated surface being on the inner side. Therefore, the speed of the rollers may be further controlled in order to prevent undesired interaction of such physical alterations of sheet S. Metering device 216 may also be utilized to help prevent undesired interactions of these physical alterations, such as the aforementioned curling, by controlling the amount of substance 214 that remains on the second surface of sheet S.

It is also desirable that the same amount of the balancing (and/or protective) substance be applied to the entire first surface of sheet S to provide a uniform coating of the substance to the surface of the sheet. Thus, coating roller 207 has to be uniformly coated with substance 211, and therefore the level of substance 211 in pan 210 is preferably precisely controlled to provide a consistent delivery of coating substance along a run of sheet S. In the preferred embodiment; the amount of a balancing and/or protective substance, such as melamine, applied on the surface of sheet S is 1–20 grams per square foot and the resin content of sheet S is 14–30 percent melamine and 12–25 percent phenolic formaldehyde. However, this amount may be varied depending on the particular application.

However, it is not desirable that the phenolic resin that is absorbed by sheet S from the second side penetrate the first side of sheet S. In general, the amount of the second applied substance 214 absorbed by sheet S is dependent to at least a certain extent on the amount of the first applied substance 211 absorbed. Therefore, in the preferred embodiment, the balancing (and/or protective) substance is coated to the surface of sheet S before the phenolic resin as at least a portion of the balancing (and/or protective) substance is controlled, according to the present invention, to remain on the surface of the sheet and, therefore, limit its interaction with the application of the second substance. Thus, to avoid the balancing (and/or protective) substance from being repelled by the phenolic resin, and also to achieve the desired penetration for the balancing (and/or protective) substance, in the preferred embodiment, the balancing (and/or protective) substance is applied to sheet S before the phenolic resin. However, it is not necessary that the balancing (and/or protective) substance be applied first, and phenolic resin may be applied before the balancing (and/or protective) substance without departing from the scope of the present invention. Furthermore, if desired, in order to obtain the desired penetration level of the phenolic resin, the speed of the rollers may be further controlled so that the balancing (and/or protective) substance does not penetrate sheet S to an extent that would repel or prevent a desired amount of penetration of sheet S by the phenolic resin.

Furthermore, the level of penetration of substances 211 and 214 and the saturation level of sheet S may be controlled by controlling various parameters inside conditioner 215. Thus, it may be desirable to determine a desired curing cycle for curing sheet S to obtain the necessary saturation level of each substance. For example, in order to achieve the desired curing, sheet S may be passed through different stages of curing so that stage one provides an optimum environment for curing one substance, such as a substance most prone to undesired migration, and stage two provides an optimum environment for curing the other substance, such as a substance less likely to migrate.

In the preferred embodiment, the ratio of the balancing (and/or protective) substance to the phenolic resin is approximately 3:2. However, this ratio may be varied depending on the end use of the laminate. For example, when the laminate is used as a counter top, the ratio may be different than when the laminate is used as a flooring panel or as a backer layer.

In an alternative embodiment of the present invention, sheet S may be coated with the same substance on both sides. For example, sheet S may be coated with phenolic resin on both sides thereby eliminating the need to submerge the sheet of laminate material in a vat of phenolic resin as is done in the prior art. The use of the present invention in this embodiment solves the problems associated with impregnating the kraft paper when it is submerged in a vat filled with phenolic resin as discussed above. For example, using reverse roll coating as described herein, to impregnate kraft paper with phenolic resin eliminates the problems associated with the production of fumes and also wastage of phenolic resin. Furthermore, the rollers used in reverse roll coating facilitate impregnating the phenolic resin upto a desired level into sheet S.

Figure 3:
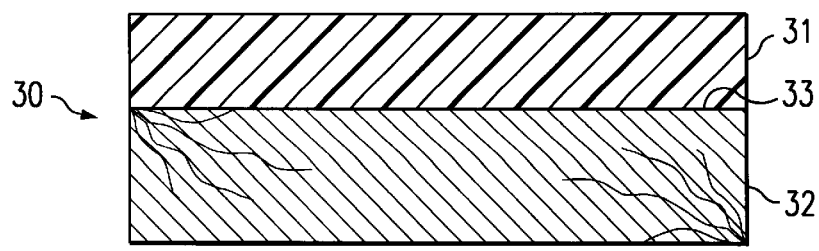
FIG. 3 shows a schematic of a sheet that has been coated on both sides according to the present invention.

FIG. 3 shows a schematic of a sheet of the preferred embodiment that has been coated on both sides with different substances. Substance 31 is coated on one side of sheet 30 as shown so that a portion of substance 31 remains on the surface of sheet 30 and another portion of substance 31 penetrates sheet 30 upto a desired level 33. Sheet 30 is coated on an opposing surface with substance 32 which penetrates sheet 30 upto a desired level 33 as shown. Although the desired level of penetration of sheet 30 by substances 31 and 32 is shown to be almost equal, the invention is not so limited, and the desired level of penetration may be varied without departing from the scope of the present invention. Furthermore, although substances 31 and 32 have been shown as distinct layers, the two substances may intermix without departing from the scope of the present invention. Furthermore, it is not necessary that sheet 30 be fully saturated with substances 31 and 32 and if desirable, portions of sheet 30 may be left unsaturated.

In order to adjust system 20 to the desired settings to enable coating the surfaces in the proper ratio according to a preferred embodiment, the bone dry weight of sheet S is first determined. One side of sheet S is then coated with substance 211 and metering device 212 and conditioner 215 adjusted until the system is capable of curing substance 211 to a desired level such as a desired percentage weight of substance 211 as determined from a comparison of the coated weight of sheet S and the bone dry weight of sheet S. Sheet S is then treated only on the second side with substance 214 and metering device 216 and conditioner 215 adjusted until the system is capable of curing substance 214 to the desired ratio again as a desired percentage weight of substance 214 as determined from a comparison of the coated weight of sheet S and the bone dry weight of sheet S. Furthermore, in addition to the metering devices and environment inside conditioner 215, the throughput of sheet S, the amount of substances deposited initially on the surface of sheet S and other operational conditions may be precisely controlled to achieve the desired result.

A monitoring device, such as a density sensor, a camera, or other optical sensor, or even various contact sensor devices may be provided to monitor the amount of the different substances on sheet S and also to monitor the thickness of the sheet during manufacturing to provide a sheet with the desired thickness and characteristics. This monitoring device preferably monitors sheet S coming out of conditioner 215 periodically and provides information useful in controlling aspects of the coating and curing process. Furthermore, the monitoring device may be used to monitor the dimensional stability of sheet S to ensure that sheet S does not warp torsionally or become distorted by tensile effects. Moreover, sheet S may be further monitored to ensure that it does not bulge, bend, or get deformed, as soon as it is coated on one side.

Furthermore, system 20 may be adapted to include more than two pans and the system adjusted so that the same system may be used to coat sheet S with different substances when desired. For example, roller 203 may be used to coat a different substance on sheet S and roller 217 adjusted accordingly so that sheet S may be made to bypass substance 211. In the alternative, if desired, only two pans may be used but a draining means provided to drain one substance from one of the pans and fill the pan with a different substance by means of a pump when a new coating substance is to be applied.

It shall be appreciated that prior art systems do not coat a kraft paper sheet with melamine resin to provide the desired balancing (and/or protective) characteristics to the laminates. Instead a resin carrier sheet is impregnated with melamine resin and used in prior art systems to provide the desired characteristics because kraft paper sheet is not suitable for impregnation with melamine. However, the present invention provides for the coating of kraft paper or other laminate material generally not adapted for coating with melamine, by adapting the melamine by suspending particles of desired size in the resin to make it suitable for impregnating the kraft paper.

Figure 6A:
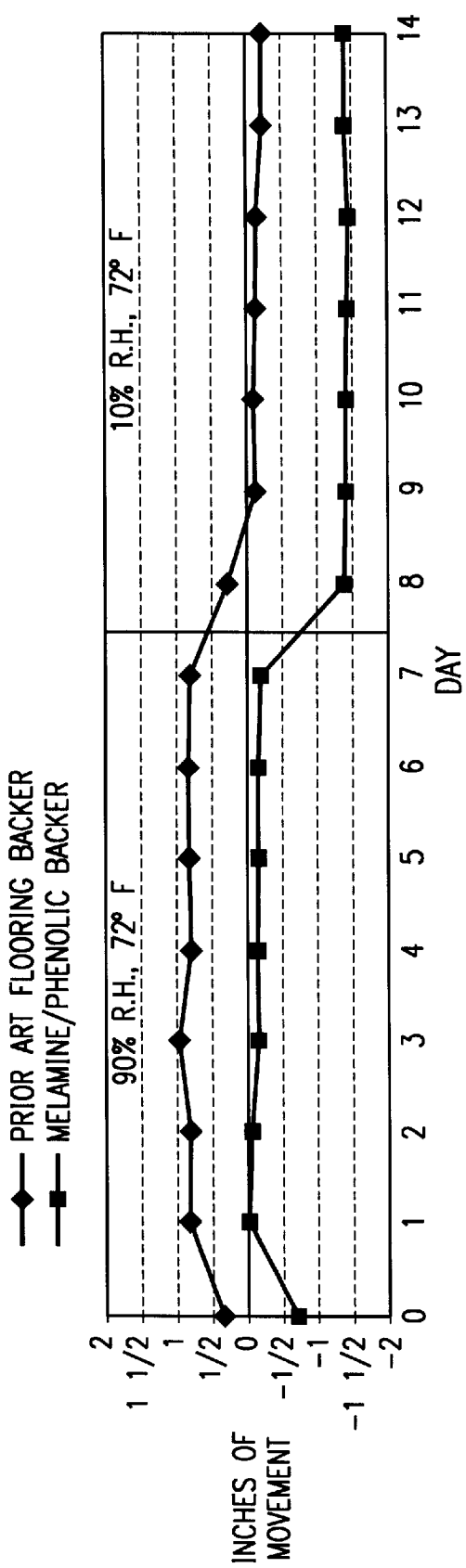
FIGS. 6A and 6B are graphical representations of the results of the table of FIG. 5.
Figure 6B:
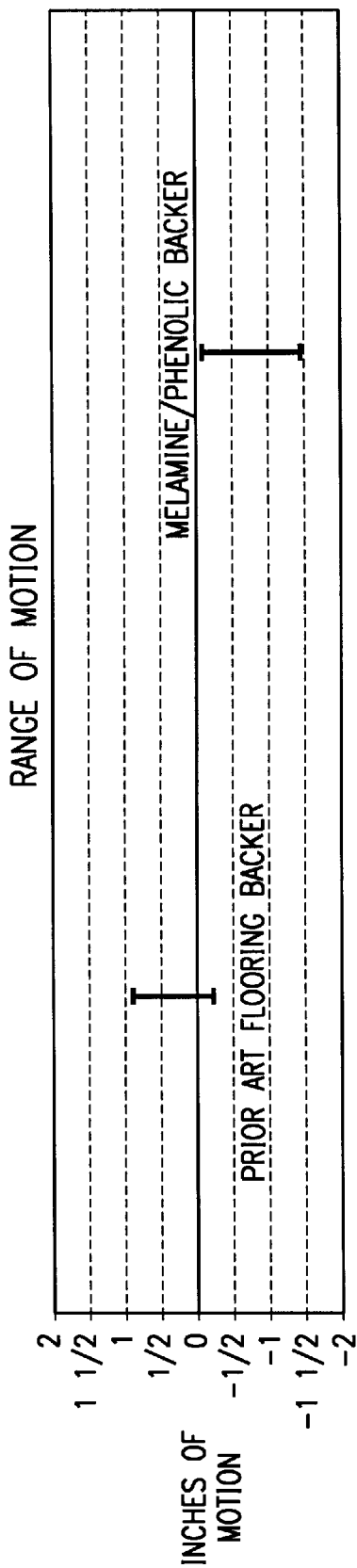

Experimentation has revealed that the preferred embodiment kraft paper sheet of the present invention treated with the preferred embodiment melamine resin provides improved balancing and protective characteristics. In performing the experiments, planks of laminate comprising a decorative laminate, a medium density fiberboard substrate and a backer were suspended in a vertical position in an environmentally controlled chamber. The backer in one set of such planks comprised of the preferred embodiment kraft paper sheet treated with melamine on one side and phenolic resin on the other side. The backer in another set of such planks comprised a melamine impregnated overlay sheet of the prior art. The temperature inside the chamber was maintained at 72° F. and the relative humidity maintained at 90% from day 1 to day 7, and 10% from day 8 to day 14. The results of the experimentation are shown in the table of FIG. 5 and graphically represented in FIGS. 6A and 6B.

It was observed that the plank comprising of the prior art backer demonstrated slight positive warping on day 0 because overlay paper of the prior art backer sheet contains fibers that absorb more moisture. On the other hand, the plank comprising of the preferred embodiment backer made of kraft paper demonstrated slight negative warping on day 0. Furthermore, the plank of laminate material comprising of the preferred embodiment kraft paper sheet treated with melamine resin on one side and phenolic resin on the other side demonstrated lesser movement under 90% relative humidity as compared to the plank of laminate material comprising prior art backer material.

Under 10% relative humidity, the preferred embodiment backer sheet demonstrated more negative movement as compared to the prior art backer sheet. However, slight negative movement of the backer is desirable to make the laminate bond more firmly with the surface on which the laminate is applied. On the other hand, positive movement of the backer gives the impression that the surface is cracked and thus, hurts the appearance of the surface. Laminates made from prior art backer sheets tend to demonstrate more positive movement than negative movement because they use a separate melamine impregnated overlay sheet which limits negative movement of the laminates made from prior art backer sheets.

Thus, the two sided coating system and method as described in the preferred embodiment provides improved balancing and protective properties by precisely controlling the amount of balancing and protective substance penetrating sheet S and also precisely controlling the amount of the substance remaining on the surface of sheet S, and therefore improving the desired characteristics, since more of the substance is on the surface. Moreover, the sheet providing the desired balancing and protective characteristics is also providing the structural cross linking due to the preferred embodiment phenolic resin. Thus, better structural cross linking is provided as migration of phenolic resin from an adjoining sheet is not the sole source of the structural bonding of this sheet of the laminate assembly.

The invention as described in the preferred embodiment eliminates the need to use a discrete melamine impregnated balance sheet with a laminate to provide the desired balancing characteristics to the laminate. Thus, substantial cost savings in terms of raw material costs, handling costs, wastage, etc. may be achieved by the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for manufacturing a sheet for a laminate product, comprising the steps of:
    coating a first surface of a sheet of kraft paper with a melamine resin penetrating into a first portion of said kraft paper and providing protective characteristics, wherein said protective characteristics are selected from the group consisting of abrasion resistance, scratch resistance, and discoloration resistance; and
    coating a second surface of said sheet with a phenolic resin penetrating into a second portion of said kraft paper and mechanically bonding with another sheet of laminate material to be included in said laminate product.

2. A method for producing a sheet for a laminate product comprising the steps of:
    coating a first side and penetrating a first portion of a kraft paper sheet with melamine resin, leaving a second side of said kraft paper sheet uncoated by said melamine resin and a second portion of said kraft paper sheet unpenetrated by said melamine resin; and
    coating an opposite side and penetrating a remaining portion of said kraft paper sheet with phenolic resin.

3. The method of claim 2, wherein said first coating step comprises the step of:
    engaging said kraft paper with a first coater to coat said first side of said kraft paper with a controlled amount of said melamine resin.

4. The method of claim 3, wherein said first coating step further comprises the step of:
    engaging said kraft paper with a first metering device to remove from said first side an amount of said melamine resin determined to leave a desired amount of said controlled amount of melamine resin on said first side, and to further provide a desired level of penetration of said kraft paper by a predetermined amount of said melamine resin.

5. The method of claim 3, wherein said second coating step comprises the step of:
    engaging said kraft paper with a second coater to apply a controlled amount of said phenolic resin to said opposite side of said kraft paper.

6. The method of claim 5, wherein said second coating step further comprises the step of:

engaging said kraft paper with a second metering device to remove from said opposite side an amount of said phenolic resin determined to provide a desired level of penetration of said kraft paper by said phenolic resin from a remaining portion of said controlled amount of said phenolic resin on said opposite side.

7. The method of claim 6, further comprising the step of:

adjusting a period said kraft paper engages said first coater, as well as a period said kraft paper engages said second coater, for proper application of said melamine resin and said phenolic resin to said kraft paper.

8. The method of claim 2, further comprising the step of:

exposing said kraft paper to a conditioning unit to contemporaneously condition said melamine resin and said phenolic resin.

9. The method of claim 8, wherein said adjusting step comprises the step of:

adjusting a period said kraft paper is exposed to said conditioning unit to allow proper conditioning of said melamine resin and said phenolic resin by said conditioning unit.

10. The method of claim 8, wherein said exposing step comprises the step of:

controlling a first conditioning attribute during said exposure to maintain a portion of said melamine resin substantially on said first side of said kraft paper, wherein said first conditioning attribute is selected from the group consisting of:
temperature;
pressure;
a catalyst; and
moisture level.

11. The method of claim 10, wherein said exposing step further comprises the step of:

controlling a second conditioning attribute during said exposure to prevent penetration of said phenolic resin into said first portion of said kraft paper, wherein said second conditioning attribute is selected from the group consisting of:
temperature;
pressure;
a catalyst; and
moisture level.

12. The method of claim 11, wherein said exposing step further comprises the step of:

controlling a third conditioning attribute during said exposure to prevent seepage of said melamine resin into said remaining portion of said kraft paper, wherein said third conditioning attribute is selected from the group consisting of:
temperature;
pressure;
a catalyst; and
moisture level.

13. The method of claim 8, wherein said exposing step comprises the step of:

controlling a rate at which said kraft paper is exposed to said conditioning unit; and maintaining a conditioning attribute of said conditioning unit to prevent penetration of said phenolic resin into said first portion of said kraft paper, and maintaining said desired amount of said melamine resin substantially in said first portion of and on said first side of said kraft paper, wherein said conditioning attribute is selected from the group consisting of:
temperature;
pressure;
a catalyst; and
moisture level.

14. The method of claim 8, wherein said conditioning unit is selected from the group consisting of an oven, a refrigeration device, a wetting device, and a drying device.

15. The method of claim 2, wherein said melamine resin is melamine formaldehyde.

16. The method of claim 2, further comprising the step of:

determining an amount of said melamine resin to be applied to said first side of said kraft paper to allow a desired amount of said phenolic resin to penetrate said kraft paper.

17. The method of claim 16, further comprising the step of:

determining an amount of said phenolic resin to be applied to said opposite side of said kraft paper to penetrate at least a portion of said kraft paper without adversely affecting said melamine resin by contaminating said melamine resin.

18. The method of claim 16, further comprising the step of:

determining an amount of said phenolic resin to be applied to said opposite side of said kraft paper to penetrate at least a portion of said kraft paper without adversely affecting said melamine resin by repelling said melamine resin.

19. The method of claim 2, further comprising the step of:

selecting a solid agent of desired size to form said melamine resin to allow said melamine resin to penetrate said kraft paper to a desired level.

20. The method of claim 2, further comprising the step of:

treating said melamine resin with a chemical agent to allow said kraft paper to be coated with said melamine resin.

21. The method of claim 2, further comprising the step of:

determining a ratio of said melamine resin and said phenolic resin to be applied to said kraft paper to form a suitable balancing layer of said melamine resin on said first side and to prevent said phenolic resin from seeping through to said first side of said kraft paper.

22. The method of claim 21, wherein said ratio of said melamine resin and said phenolic resin to be applied to said first and opposite sides respectively of said kraft paper is approximately 3:2.

23. The method of claim 2, wherein said melamine resin is applied to said first side before said phenolic resin is applied to said opposite side to prevent said phenolic resin from penetrating said kraft paper beyond said remaining portion and to allow said melamine resin to penetrate said kraft paper up to said first portion.

24. The method of claim 2, wherein said melamine resin provides protective characteristics.

25. The method of claim 24, wherein said protective characteristics comprise at least one characteristics selected from a group of protective characteristics consisting of:

abrasion resistance;

scratch resistance; and discoloration resistance.

26. The method of claim 2, wherein said phenolic resin provides mechanical bonding with a sheet of laminate material to be included in said laminated product.

27. The method of claim 2, wherein said melamine resin prevents warpage of said laminate.

* * * * *